(12) United States Patent
Gensert et al.

(10) Patent No.: US 7,081,012 B2
(45) Date of Patent: Jul. 25, 2006

(54) DEVICE FOR DUCTING ELECTRICAL LINES THROUGH THE WALL OF A FUEL TANK

(75) Inventors: Heiko Gensert, Eppstein (DE); Dieter Hagist, Lahnstein (DE); Wolfgang Sinz, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/470,056

(22) PCT Filed: Jan. 18, 2002

(86) PCT No.: PCT/DE02/00144

§ 371 (c)(1),
(2), (4) Date: Jan. 26, 2004

(87) PCT Pub. No.: WO02/058954

PCT Pub. Date: Aug. 1, 2002

(65) Prior Publication Data

US 2005/0101185 A1    May 12, 2005

(30) Foreign Application Priority Data

Jan. 25, 2001    (DE)    ............... 101 17 976

(51) Int. Cl.
*H01R 13/73*    (2006.01)
(52) U.S. Cl. .................. 439/559; 439/935; 174/151
(58) Field of Classification Search ............. 439/559, 439/935, 587, 589
See application file for complete search history.

(56) References Cited

U.S. PATENT DOCUMENTS

| | | | |
|---|---|---|---|
| 3,092,290 A | | 6/1963 | Hoelle |
| 3,597,716 A | * | 8/1971 | Stuart et al. ............... 439/510 |
| 3,685,005 A | * | 8/1972 | D'Alessandro ............ 439/736 |
| 3,853,390 A | | 12/1974 | De Koeyer et al. |
| 4,174,145 A | * | 11/1979 | Oeschger et al. .......... 439/589 |
| 4,420,210 A | | 12/1983 | Karol et al. |
| 4,445,744 A | | 5/1984 | Sedig et al. |
| 4,960,391 A | | 10/1990 | Beinhaur et al. |
| 5,386,923 A | * | 2/1995 | Nakashima et al. ....... 220/86.2 |
| 5,886,266 A | | 3/1999 | Stiller et al. |
| 6,555,754 B1 | * | 4/2003 | Gilmour ..................... 174/151 |
| 6,755,670 B1 | * | 6/2004 | Korber ........................ 439/95 |

FOREIGN PATENT DOCUMENTS

| | | |
|---|---|---|
| DE | 2 309 825 | 2/1973 |
| DE | 197 01 246 A1 | 1/1997 |
| EP | 0 747 592 A1 | 12/1996 |
| EP | 0 964 229 A1 | 12/1999 |
| GB | 1107297 | 3/1968 |

* cited by examiner

*Primary Examiner*—Tho D. Ta
(74) *Attorney, Agent, or Firm*—Morrison & Foerster LLP

(57) ABSTRACT

The invention relates to a device for ducting electrical lines through the wall of a fuel tank (1), whereby a steel support (3) is materially connected to the wall of the fuel tank (1). Contacts (4) are introduced through the support (3). The contacts (4) have a sleeving (5) made from glass or ceramic. A leakage of fuel vapors from the fuel tank (1) is thus almost completely excluded.

15 Claims, 1 Drawing Sheet

DEVICE FOR DUCTING ELECTRICAL LINES THROUGH THE WALL OF A FUEL TANK

CLAIM FOR PRIORITY

This application claims priority to International Application No. PCT/DE02/00144 which was published in the German language on Aug. 1, 2002.

TECHNICAL FIELD OF THE INVENTION

The invention relates to a device for ducting electrical lines through the wall of a fuel tank, and in particular, having a carrier which is inserted into an opening in the fuel tank and closes it off in a sealing fashion, and having contacts which lead through the carrier to the outside of the fuel tank.

BACKGROUND OF THE INVENTION

Devices for ducting electrical lines are used, for example, for a fuel pump and a level indicator and are known from practice. As a rule, a carrier is fabricated from plastic. The contacts are pressed into the carrier until one end of the contacts protrudes on each side of the carrier, or the contacts are encapsulated by injecting molding when the carrier is manufactured and are thus embedded in a materially joined fashion in the carrier material. Then, electrical lines can be connected to the contacts on both sides of the carrier. The carrier is clipped, for example, onto the opening of the fuel tank. In addition, an elastomer seal is arranged between the fuel tank and the carrier.

A disadvantage of the known device is that fuel vapors can diffuse through the carrier and regions adjoining the contacts. As a result, fuel can escape from the fuel tank and enter the environment.

SUMMARY OF THE INVENTION

The invention discloses a device for ducting electrical lines through the wall of a fuel tank such that it ensures a particularly high seal of the carrier and of the contacts. This is accomplished in one embodiment according to the invention in that the carrier has at least one sheath, which is fabricated from glass or ceramic, for the contacts.

This configuration permits the escape of fuel through the carrier to be kept particularly small as glass or ceramic virtually completely prevents the diffusion of fuel vapors. In addition, the sheath ensures sufficient isolation of the contacts. As the contacts which are usually fabricated from metal can be connected particularly reliably to glass and ceramic, gaps in the region of the contacts are avoided as a result of the invention. The carrier therefore has a particularly good seal with respect to fuel vapors. At the same time, the contacts have a wide variety of cross sections, for example circular, oval or rectangular.

The carrier could be fabricated completely from ceramic, for example. According to one advantageous embodiment of the invention, the carrier is of more particularly cost-effective design if it is fabricated from metal and connected to the sheath of the contacts in a gastight fashion. In particular, when the carrier is connected to a fuel tank by a wall made of metal, emissions of fuel from the fuel tank can be reduced to virtually zero as a result of the invention.

In the case of contacts which are fabricated from metal with a low melting point, according to another advantageous embodiment of the invention it is possible to prevent the contacts melting when the sheath is cast with glass if the contacts have a bushing made of steel in the region of their sheath. The connection between the bushing made of steel and the contacts can easily be configured in a gastight fashion by pressing or soldering, for example.

A plurality of contacts could have a common sheath made of glass or ceramic. However, according to another advantageous embodiment of the invention, the carrier has a particularly high degree of mechanical stability if, when there are a plurality of contacts, at least one of the contacts has a sheath which is separated from the other contacts by the material of the carrier.

The connection of the carrier to the sheath is structurally simple if a region of the carrier which adjoins the sheath has a rough surface. The contacts or the bushings made of steel may also have a rough surface.

According to another advantageous embodiment of the invention, the connection between the sheath and the carrier can be reliably sealed if the region of the carrier which adjoins the sheath has at least one groove-like recess and if part of the sheath is arranged inside the groove-like recess. The contacts or the bushings made of steel can also be connected to the sheath in a similar fashion.

According to another advantageous embodiment of the invention, pull relief for the contacts is structurally simple if a connecting element for a plug which is to be plugged onto the contacts is attached to the carrier in the region of the contacts. The contacting element is preferably fabricated from plastic.

The ingress of spray water underneath the connecting element could lead to creepage currents between the contacts. According to another advantageous embodiment of the invention, the ingress of spray water can be avoided if the connecting element which is to be arranged on the outside of the fuel tank has an elastomer seal which bears against the carrier.

The device according to the invention requires a particularly small number of components to be mounted if the connecting element which is to be arranged on the outside of the fuel tank has a circumferential bead and is prestressed with respect to the carrier by means of the bead.

The device according to the invention is structurally simple if the connecting element is connected to the carrier in a materially joined fashion. With the carrier fabricated from metal and the connecting element fabricated from plastic it is possible to produce the materially joined connection easily using an injecting molding method when the connecting element is fabricated.

In order to close off a mounting opening in the fuel tank, the carrier can be embodied in the form of a closure lid, or welded into such a closure lid. A seal is arranged between the closure lid and the fuel tank. The closure lid is screwed to the fuel tank.

The seal of the fuel tank is improved if the carrier is welded or soldered to the fuel tank in a gastight fashion.

According to another advantageous development of the invention, the carrier has particularly small radial dimensions if the carrier is of sleeve-shaped design and has an external diameter corresponding to the opening of the fuel tank.

In order to reduce the fabrication costs of the device according to the invention further, it helps if the carrier is configured in a plate shape and has a centering device which projects into the opening in the fuel tank.

BRIEF DESCRIPTION OF THE DRAWINGS

The invention permits numerous embodiments. In order to understand the invention, drawings are illustrated and described below. In the drawings.

DETAILED DESCRIPTION OF THE INVENTION

Figure 1:
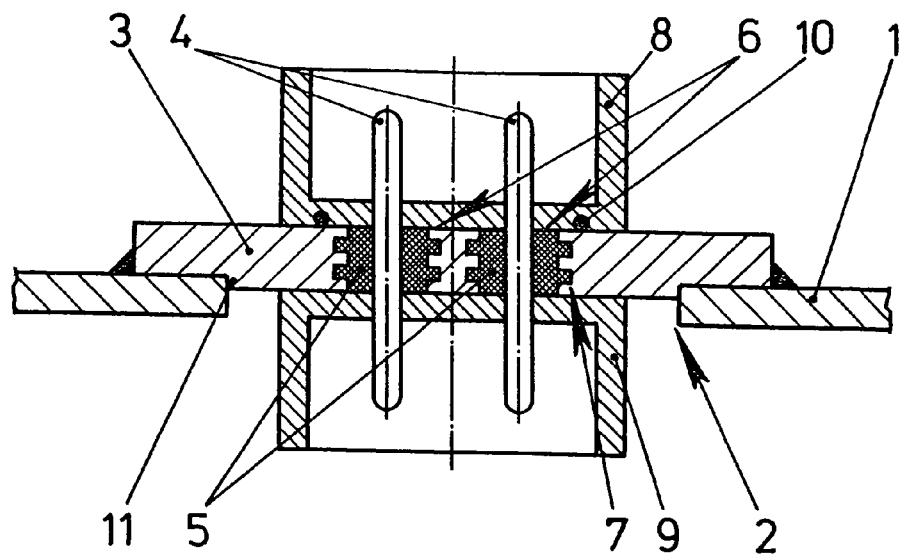
FIG. 1 shows a section illustration of a device according to the invention with a plate-shaped carrier.

FIG. 1 shows an upper region of a fuel container 1 for a motor vehicle having a device for ducting electrical lines through the wall of the fuel tank 1. The device has a carrier. 3 which is inserted into an opening 2 in the wall of the fuel tank. The carrier 3 is fabricated from steel and welded in a sealed fashion to the fuel tank 1 which is also fabricated from steel. Pin-like contacts 4 made of metal are led through the carrier 3. The contacts 4 have a round cross section and are used, for example, to electrically connect a fuel pump arranged within the fuel tank 1 to an on-board electrical system of the motor vehicle, or for connecting a filling level sensor arranged in the fuel tank 1. The contacts 4 each have a sheath 5 made of glass or ceramic. In order to accommodate the sheaths 5, the carrier 3 has respective breakthroughs 6 with circumferential groove-like recesses 7. The sheaths 5 penetrate the groove-like recesses 7 and are connected in a gastight fashion to the carrier 3 and to the contacts 4. Connecting elements 8, 9 are attached to both sides of the carrier 3. The connecting element 8 with is arranged on the outside of the fuel tank 1 is sealed with respect to the carrier 3 by means of an annular elastomer seal 10. The connecting elements 8, 9 are fabricated from plastic and are prestressed with respect to the carrier 3, or connected thereto in a materially joined fashion. The carrier has a protruding centering edge 11 for its precise alignment with the opening.

Figure 2:
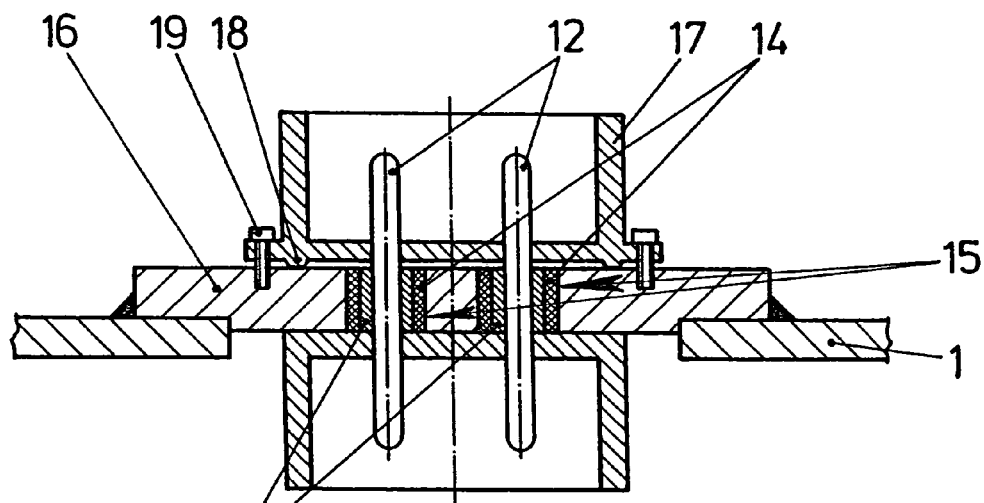
FIG. 2 shows another embodiment of the device according to the invention.

FIG. 2 shows a device which differs from FIG. 1 in particular in that contacts 12 are each inserted into a bushing 13. The bushings 13 have sheaths 14 made of glass or ceramic and are arranged in breakthroughs 15 in a carrier 16 which is welded to the wall of the fuel tank 1. The breakthroughs 15 of the carrier 16 have a roughened surface here in order to secure the sheath 14. Furthermore, FIG. 2 shows that the connecting element 17 which is arranged on the outside of the fuel tank 1 has a circumferential bead 18 with which it is prestressed against the carrier 16. The connecting element 17 is connected to the carrier 16 by means of screws 19.

Figure 3:
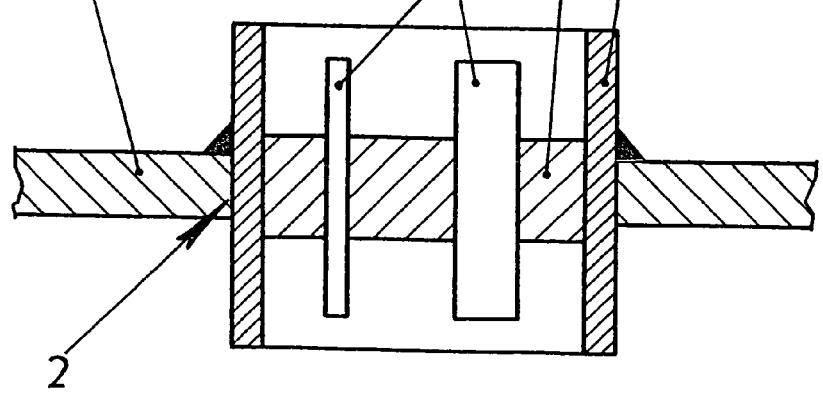
FIG. 3 shows a sectional illustration of a device according to the invention with a sleeve-shaped carrier.

FIG. 3 shows a device for ducting electrical lines through the wall of the fuel tank 1, in which a carrier 20 which is welded into the opening 2 of the fuel tank 1 is of sleeve-shaped design. Contacts 21 which lead through the carrier 20 are arranged within the sleeve-shaped carrier 20 and have a common sheath 22 made of glass or ceramic. The sheath 22 is connected in a sealed fashion to the inside of the sleeve-shaped carrier 20. The contacts 21 have a rectangular cross section.

The invention claimed is:

1. A device for ducting electrical lines through a wall of a fuel tank, comprising:

a carrier inserted into an opening in the fuel tank and closed off in a sealing fashion; and contacts which lead through the carrier to outside of the fuel tank, wherein the carrier has at least one sheath which is fabricated from glass or ceramic, for the contacts, wherein the height of the at least one sheath is less than or equal to the thickness of the carrier;

wherein the carrier is plate-shaped.

2. The device as claimed in claim 1, wherein the carrier is fabricated from metal and is connected to the sheath of the contacts in a gastight fashion.

3. The device as claimed in claim 1, wherein the contacts have a bushing made of steel in a region of the sheath.

4. The device according to claim 1, further comprising a connecting element for a plug, which is configured to be plugged onto the contacts, is the carrier in the region of he contacts.

5. The device as claimed in claim 1, wherein the contacts have a bushing made of steel in a region of the sheath.

6. A device for ducting electrical lines through a wall of a fuel tank, comprising:

a carrier inserted into an opening in the fuel tank and closed off in a sealing fashion; and contacts which lead through the carrier to outside of the fuel tank, wherein the carrier has at least one sheath, which is fabricated from glass or ceramic, for the contacts, and when a plurality of contacts exist, at least one of the contacts has a sheath which is fabricated from a different material of the carrier;

wherein the carrier is plate-shaped.

7. The device according to claim 6, wherein a region of the carrier which adjoins the sheath has a rough surface.

8. The device according to claim 6, wherein a region of the carrier which adjoins the sheath has at least one groove-like trecess, and in that part of the sheath is arranged within the groove-like recess.

9. The device according to claim 6, wherein the contacts have a circular, oval or rectangular-shaped cross section.

10. The device arrording to claim 6, wherein the carrier is welded or soldered to the fuel tank in a gas-tight fashion.

11. The device according to claim 6, wherein the carrier has a centering device which projects into the opening in the fuel tank.

12. The device according to claim 6, further comprising a connecting element for a plug, which is configured to be plugged onto the contacts is attached to the carrier the region of the contacts.

13. The device according to claim 12, wherein the connecting element is connected with the carrier in a materially joined fashion.

14. The device according to claim 12, wherein the connection element which is configured to be arranged on an outside of the fuel tank has an elastomer seal which bears against the carrier.

15. The device according to claim 14, wherein the connecting element wherein is configured to be arranged on the outside of the fuel tank has a circumferential bead and is prestressed with respect to the carrier by means of the bead.

* * * * *